United States Patent [19]

Gilhousen et al.

[11] Patent Number: 4,928,274
[45] Date of Patent: May 22, 1990

[54] MULTIPLEXED ADDRESS CONTROL IN A TDM COMMUNICATION SYSTEM

[75] Inventors: Klein S. Gilhousen, San Diego; Franklin P. Antonio, Del Mar, both of Calif.

[73] Assignee: Qualcomm, Inc., San Diego, Calif.

[21] Appl. No.: 144,905

[22] Filed: Jan. 19, 1988

[51] Int. Cl.⁵ .............................................. H04J 3/24
[52] U.S. Cl. ................................... 370/92; 370/95.1; 370/110.1
[58] Field of Search ................. 370/50, 75, 76, 92–95, 370/97, 104, 110.1; 340/825.44

[56] References Cited

U.S. PATENT DOCUMENTS

| | | | |
|---|---|---|---|
| 4,009,343 | 2/1977 | Markey et al. | 179/15 |
| 4,117,267 | 9/1978 | Haberle et al. | 179/15 |
| 4,172,214 | 10/1979 | McDonald et al. | 179/15 |
| 4,288,868 | 9/1981 | Grotjohann et al. | 370/30 |
| 4,352,955 | 10/1982 | Kai et al. | 370/110.1 |
| 4,504,946 | 3/1985 | Raychaudhuri | 370/95 |
| 4,549,303 | 10/1985 | Gutleber | 375/25 |
| 4,581,749 | 4/1986 | Carney et al. | 375/44 |
| 4,608,684 | 8/1986 | Upp | 370/58 |
| 4,617,658 | 10/1986 | Walters | 370/84 |
| 4,625,308 | 11/1986 | Kim et al. | 370/104 |
| 4,644,529 | 2/1987 | Amstutz et al. | 370/60 |
| 4,646,294 | 2/1987 | Eliscu et al. | 370/94 |
| 4,675,863 | 6/1987 | Paneth et al. | 370/50 |
| 4,686,670 | 8/1987 | Kessels et al. | 370/68 |
| 4,686,672 | 8/1987 | Namiki | 370/95 |
| 4,686,673 | 8/1987 | Hotta | 370/104 |
| 4,704,608 | 11/1987 | Sato et al. | 340/825.44 |
| 4,707,832 | 11/1987 | Glenn et al. | 370/110.1 |
| 4,713,808 | 12/1987 | Gaskill et al. | 370/93 |
| 4,736,371 | 4/1988 | Tejima et al. | 370/104 |
| 4,754,453 | 6/1988 | Eizenhofer | 370/95 |

Primary Examiner—Douglas W. Olms
Assistant Examiner—Melvin Marcelo
Attorney, Agent, or Firm—Brown, Martin, Haller & McClain

[57] ABSTRACT

A message communication system employing one or more centralized communication stations transmitting messages through Earth orbit relay satellites to mobile receivers utilizing Time Division Multiplexed (TDM) communication signals having signal time frames divided into a series of transmission channels. A predetermined number of the channels are designated as address channels with the remainder being used for data transfer. Information transmitted on the address channels is used by receivers to determine both the presence of a message and its corresponding data transmission channel. Each system receiver scans, and tracks only the communication signal address channels until a message addressed to that receiver is detected, at which time the selected receiver changes channels to the designated data channel for reception of the message. Thus, demodulation of the entire communication signal is not required and processing time and power is reduced for the typical waiting condition when messages are not being received. While a message is being received only a portion of the communication signal need to be received, demodulated and decoded. The decoded message is then displayed on a display screen or similar device for the recipient.

21 Claims, 3 Drawing Sheets

MULTIPLEXED ADDRESS CONTROL IN A TDM COMMUNICATION SYSTEM

BACKGROUND OF THE INVENTION

1. Field of the Invention

The present invention relates to communication systems and more particularly to telecommunication systems employing central message transmitting stations and Earth orbit relay satellites to send messages to mobile receivers. The invention further relates to a method and apparatus for transferring messages to one or more of a plurality of receivers using narrowband, multiplexed, receiver addresses and channel assignments to reduce signal demodulation requirements for each receiver.

2. Background of the Art

There is an ever increasing need for a variety of half-duplex communication systems to provide message delivery or brief transfers of information from a central control station to a multiplicity of remote system users. There are a substantial number of commercial, governmental, and private applications requiring the delivery of messages to a large number of geographically dispersed terminals, or mobile receivers, often on an irregular basis. Applications for message services include such diverse uses as government services (military, law enforcement, legislative) where secure communications are desired, forestry services, disaster relief or coordination, and commercial transport or message delivery services.

Other examples include the interstate trucking industry where dispatchers wish to communicate short messages to trucks located anywhere in continental U.S. Presently such communication is restricted to periodic telephonic communications between drivers and a central dispatcher or contact person. Currently, truck drivers must call long distance from many remote geographic locations to retrieve messages or to update delivery and pick-up schedules. However, it is hard, if not impossible, for drivers to consistently "call in" at fixed, scheduled, times since telephone services are not always readily available in many areas. The conventional "call in" approach also creates accounting problems and major personal inconvenience by requiring vehicle drivers to use money or charge cards for long distance calls at substantial cost even when no updated message or information is transferred.

Aside from conventional telephone systems, other communication systems have attempted to address the mobile market. Radio telephone, cellular telephone, and portable radio transceivers (CB) are all capable of providing some form of communication between a mobile receiver and a base unit. However, these communication systems suffer from several drawbacks and have proven inadequate as message communication systems for serving a large number of widely dispersed users.

Current mobile communication services operate on a limited number of high frequency, low data rate, channels and have many more potential users than system capacity. Many systems, like cellular telephone, employ frequency reuse across an array of cells to increase capacity, with each cell having a short transmission range to increase frequency reuse and reduce interference. However, these lower power transmissions are more prone to frequency selective fading and signal blocking and require highly mobile users to frequently change channels as new cells are traversed. These systems are also prone to sudden communication loss when no channels are available in a new cell.

Cellular systems economically serve large metropolitan areas but leave many urban and most rural areas without any service or direct coverage. Messages for these areas are switched to conventional telephone or satellite carriers for long distance transfers.

Direct communication, non-cellular, using traditional mobile radio transceivers also requires constant monitoring of a variety of frequencies all of which are crowded with existing traffic. These services, like cellular telephone, are subject to frequent system overload and signal degradation from several interference sources which makes them incapable of handling a large volume of traffic. These transceivers also have a low range imposed by the need to prevent interference with other communication systems.

Communication systems based on Earth orbital relay satellites are proposed increasingly as the new approach to solve many communication problems, especially coverage of geographically diverse, low user density or rural areas. Several systems have been developed to operate through orbital relay satellites and central communication stations. Examples of such systems are found in U.S. Pat. Nos. 4,555,651 and 4,504,946.

However, the high gain, low interference requirements imposed on such systems, especially in regards to adjacent Earth orbit relay satellites or concurrent satellite users, requires the use of large receiver antennas on the order of 4 feet or more in diameter, which eliminates mobile applications. In addition, current satellite systems must contend with low data transfer rates which limit the number of users and amount of data transferred. Otherwise, tracking and demodulating a high data rate satellite signal requires very high speed, complex and expensive, receivers that consume a lot of power for signal scanning and processing even when not receiving messages.

What is needed is a communication system that allows continuous delivery of messages as well as related communication parameters or control information to a large number of users over a large geographical area. The system also needs to be cost effective, simple to operate, maintain, and install, and minimize antenna requirements.

SUMMARY OF THE INVENTION

With the above problems of the art in mind it is a purpose of the present invention to provide a waveform or modulation scheme that provides performance comparable to a predetermined signal to interference ratio in any interference scenario encountered.

Another purpose of the invention is to use a novel modulation, coding, and multiplexing technique which allows an inexpensive mobile receiver with a very small antenna suitable for use on a moving vehicle, to receive and transmit data reliably using a satellite repeater.

Yet another purpose of the invention is to provide a modulation and coding scheme that is implemented digitally, preferably as firmware in signal processing chips of the VLSI type and in microcomputers.

One advantage of the present invention is a high performance, cost effective, and flexible implementation.

Another advantage is that the present invention provides a modulation and coding scheme that allows mass production of circuits and modules to be used for the remaining analog functions for the mobile terminals.

An object of the invention is to allow flexibility in the data transfer rate so that receivers of differing transfer rates or capabilities are efficiently accommodated.

Yet another advantage of the system that results from this latter object is that more energy per bit can be used to compensate for unequal downlink power density across large geographical areas.

These and other purposes, objects, and advantages are realized in a message communication system for sending messages from central communication stations to one or more mobile receivers through Earth orbital relay stations using Time Division Multiplexed communication signals, by employing at least one central communication station having a transmitter producing a TDM communication signal which comprises N serial channels, with D data channels, for $D<N$, used exclusively for transmission of message data and A address channels, where $A=N-D$, used for transmission of address information in the form of receiver addresses where messages are designated to be sent from the station and corresponding data channels on which the message is transmitted. An exemplary embodiment employs 25 channels with 4 address channels and 21 data or message channels.

The central communication station employs a receiver assignment device which determines the receiver each message is directed to and a channel assignment device for assigning each message to at least one of the data channels for transmission. An address controller transfers one receiver address and an associated channel assignment onto one of the address channels in response to input messages intended for each receiver. Alternatively, a plurality of receivers are designated where a message is intended for several receivers in the system. A message input control device is connected to the channel assignment device and receives digital messages and transfers them onto designated data channels in response to an assignment from the channel assignment device at a rate of one message per channel. The input message data is nominally transferred at a rate on the order of at least 5,000 bits per second.

In a preferred embodiment the communication system applies Golay[24,12] block coding to the digital messages prior to transmission and applies a corresponding Golay[24,12] block decoding process to resulting symbol data when received. The Golay coding generates 2 digital symbols for each data symbol resulting in a channel transmission rate on the order of 10,000 symbols per second. In addition, a checksum computation is performed on input digital messages with a series of bits being added to the end of the message for checksum verification by the receiver.

In further aspects of the invention, the operating frequency of the TDM communication signal is frequency hopped on a predetermined periodic basis over a preselected number of frequencies to decrease the power density of the communication signal.

Each message has a predetermined maximum bit length. The ratio of the number of address channels to data channels is approximately equal to the ratio of the number of digital bits used to define a receiver address and channel designation to the number of bits used to define each of the message. Digital message signals are generally padded with zeros where necessary to have predetermined transmission lengths.

The central communication station uses a conversion means to convert incoming message information into digital messages at a predetermined transfer rate on the order of 5,000 bits a second. The digital messages are then used to modulate a carrier to form the communication signal. The transmitter is connected to at least one narrow-beam antenna which directs communication signals to a preselected orbiting relay satellite.

The communication system of the present invention uses mobile receivers having small, portable, directable, narrow-beam antennas connected to a demultiplexer and other means for detecting, demodulating, and decoding the TDM communication signal to receive message data. The receiver demultiplexes and demodulates the communication signal at a rate only of 1/N times the transmission rate when receiving data. An address storage means records and stores a preassigned address used exclusively for that receiver. Alternatively, the address storage can store system or class type addresses for polled or broadcast messages and may be reprogrammed according to new address assignments transmitted from a central communication facility.

When an address assignment is received along with an associated data channel designation, the receiver is automatically adjusted by a channel selector to only receive and demodulate the designated data channel portion of the communication signal. Coded data received on the designated channel is demodulated, decoded where necessary, and transferred to a message display device for displaying the message in visual form, as a series of alphanumeric characters on a display screen. Alternatively, a small print out such as by a small thermal printer can provide hard copies of messages for later reference.

If reception of the communication signal is lost prior to completion of the message or the message reaches a natural termination point, the channel selector automatically readjusts the receiver to demultiplex the communication signal and demodulate address channels.

BRIEF DESCRIPTION OF THE DRAWINGS

The novel features of the present invention may be better understood from the accompanying description when taken in conjunction with the accompanying drawings in which.

DETAILED DESCRIPTION OF A PREFERRED EMBODIMENT

The present invention provides a method and apparatus for communicating messages or other information to one or more remote, mobile receivers. The communication system provides this information transfer for a large number of users without requiring each receiver to demodulate or decode a wide bandwidth signal on a continuous basis. This is accomplished by establishing a multi-channel Time Division Multiplexed (TDM) communication signal and dedicating one or more of the channels to transmit address information that designates message recipients and reception channels for each message. The address information is received and demodulated by each receiver at a rate much less than that required to demodulate the entire TDM communication signal. The address information is demodulated by each receiver until a message for that receiver, and its corresponding channel assignment, are detected, at which time that receiver switches to the designated data channel for message reception.

Figure 1:
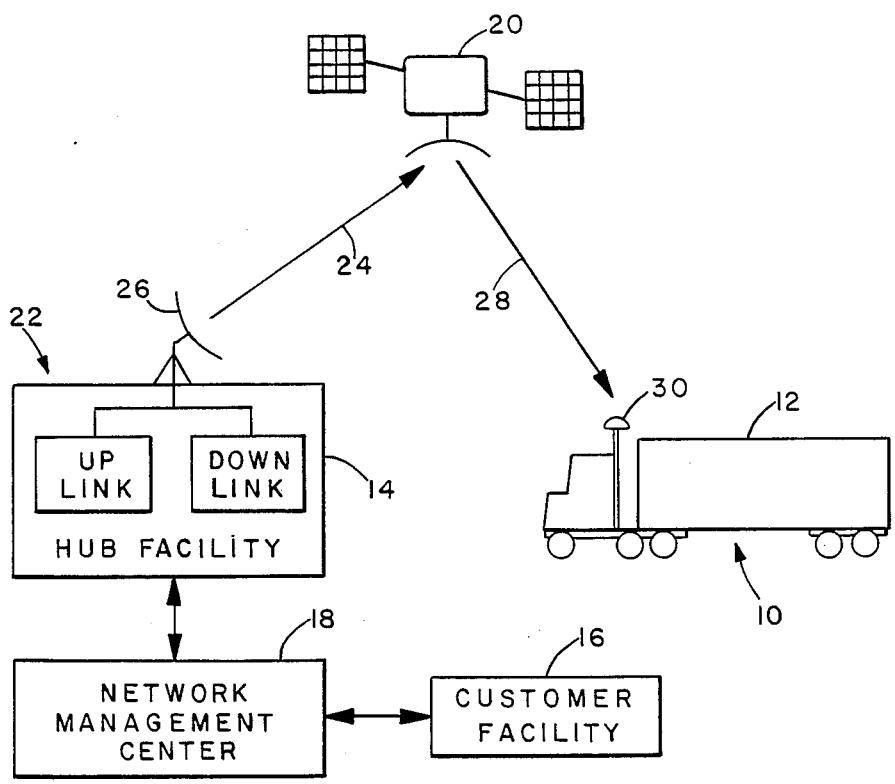
FIG. 1 illustrates an overall diagram of a communication system operating according to the principles of the present invention.

An overview of a communication system operating according to the principles of the present invention is illustrated in FIG. 1. In FIG. 1, a communication system 10 is illustrated having a mobile receiver (not shown) mounted in a vehicle such as a truck 12. The truck 12 represents any of a variety of vehicles whose occupants desire to obtain at least occasional updated information, status reports, or messages from a central communication source. As previously discussed, truck drivers or various drayage personnel often find automatic access to periodic messages extremely useful for more efficient operation.

A message is transmitted to the truck 12 from a central transmission facility or terminal 14 referred to as a Hub facility. The central terminal or Hub 14 can be placed at a location such as a trucking terminal or central dispatch office allowing lower site costs and direct access for message transmission equipment.

Alternatively, the Hub 14 is located in a remote location more ideally suited for low interference ground-to-satellite transmission or reception. In this case, one or more system user facilitates in the form of central dispatch offices, message centers, or communication offices 16 are tied through a telephonic, optical or other communication link to the Hub 14. In addition, for large numbers of remote customer message centers, a message or network management center 18 can be employed to more efficiently control the priority, access, accounting, and transfer characteristics of message data.

The Hub 14 or management center 18 can be interfaced to existing communication systems using well known telephone interface equipment such as high speed modems or codecs which feed message signals into the communication system 10. High speed data management computers can also be used to determine message priorities, authorization, and accounting, and otherwise control access to the communication system 10.

The Hub 14 employs an Extremely High Frequency (EHF) transmitter at 14 GHz to establish an uplink communication path with a geosynchronous Earth orbiting relay satellite 20. The uplink is maintained at one or more of a number of preselected frequencies or frequency ranges. A typical satellite system employs a series of repeater transponders for transmitting 12 GHz frequency signals for TV or data transmissions to ground stations.

The preferred embodiment of the communication system 10 employs uplink and downlink carrier frequencies in the EHF Ku band to allow access through these transponders on existing or new communication satellites already launched or planned. The communication system 10 can take advantage of unused satellite capacity at these frequencies and does not require the launching of its own dedicated satellites.

The Hub's transmission signal is transferred through a diplexer 22 to an antenna 26. However, the diplexer is only needed for two-way communication systems, such as where a return acknowledgment, message, or location signal is used, or for sharing the antenna 26 with alternate transmission systems.

A communication signal, designated 24, is transmitted through the antenna 26 to the communications satellite 20 at the preselected uplink carrier frequency. The communication signal 24 is received by the relay or repeater satellite 20 where it may be translated to a second frequency for the downlink transmission 28 using circuitry known in the art as a transponder. Those skilled in the art of communications understand the apparatus needed to perform this reception and conversion function which are known in the art.

The transmitted downlink signal 28 is received by a mobile receiver through a small generally directional antenna 30. The antenna 30 is constructed to have about 15 dB of gain and to be directional within a 40°-50° (10 elevation beamwidth and 15°-30° (15) azimuthal beamwidth. The antenna 30 is mounted so that it is capable of being continuously rotated over a 360 degree arc and is connected to an antenna pointing and tracking control system 74 for tracking the satellite 20 as the vehicle 12 changes position relative to the satellite which is positioned in Earth synchronous orbit. An exemplary antenna rotation mechanism is found in co-pending U.S. patent application Ser. No. 07/145,790 which is assigned to the assignee of the present invention.

Messages, or message data, are transferred into the Hub 14, or control station 18, where they are converted into digital message signals which are subsequently transferred by communication system 10 at a rate on the order of 5,000 bits per second. Those skilled in the art will readily understand that the teachings of the present invention apply to higher, or lower, data transfer rates when circuitry operating at the appropriate speed is employed. Messages can be received directly as digital data at various bit rates and accumulated or stored for translation to the desired system transfer rate. Alternately, messages are received as audio message signals that are keyed in by system operators to form the desired message signals.

Each message signal can be subjected to a variety of coding, encryption, or error detection and correction schemes prior to transmission. Where desired, individual receivers can employ unique codes or ciphers to provide secure message delivery capabilities. However, to reduce transmission errors and provide for error correction for all messages transmitted by the communication system 10, a two step encoding process is implemented for all digital messages or message data.

The first step comprises applying a system 10 checksum algorithm on the digital data. In the preferred embodiment the checksum algorithm employs on the order of 30 bits of information to indicate the correct result of the checksum computations. An exemplary checksum formula would be the computation of the polynomial: $X^{30}+X^{29}+X^3+X^2+X+1$. When calculating this checksum the address field (see below) is ignored so that channel addresses do not alter the checksum.

The second step comprises encoding the data using a Golay [24,12] block code to encode every 12 bit block of message information, including the checksum, type and recipient information, into 24 binary symbols for transmission. These 24 bits are then transferred at the desired system transfer rate. Using the Golay[24,12] block coding scheme means that 5,000 bits of message data forms a 10,000 bit encoded symbol stream for transmission. Therefore, the system 10 transmission signal at 10,000 binary symbols or bits per second to accommodate the 5,000 bit per second input data rate. On the reception end the code symbols or blocks are decoded to regenerate the 12 bit blocks of message data. As known in the art the operation of a Golay[24,12] or similar code acts to minimize transmission error by decreasing the impact of single bit errors on a data stream through spreading the data out over multi-bit patterns. Each bit error affects only a fraction of a bit in the message which is effectively compensated for by the error correction schemes used until very high error rates occur.

The encoded message symbols are used to modulate a frequency generator or source such as a Direct Digital Synthesizer which creates a phase and frequency modulated carrier, at the preselected frequency, for transmission to the satellite 20. During modulation each symbol is shifted in phase from the previous symbol, either −90° to indicate a logical 0 or +90° to specify a logical 1. This is called Differential Advance Retard Keying and improves acquisition by the receiver because every symbol contains a phase transition. In addition, a direct sequence spread spectrum modulation of the data may be used to spread the bandwidth for transmission.

To and accommodate a large number of receivers at potentially different burst rates, a Time Division Multiplexed (TDM) transmission scheme is used. The TDM approach divides the total transmitted (or received spectrum into temporal increments or frames of predetermined length. Messages or message signals transmitted by the communications system 10 or relay satellite 20 are allocated portions of this time controlled sequence known as channels, and no other signal uses the system at exactly the same time. The allocated portions or channels are very small, temporally, and their interleaving across successive frames very large so that communication appears simultaneous to all receivers. Methods and apparatus for generating, transmitting, and controlling TDM signals are well known in the communication art and can be accomplished using a variety of signal multiplexing and control devices.

Figure 2:
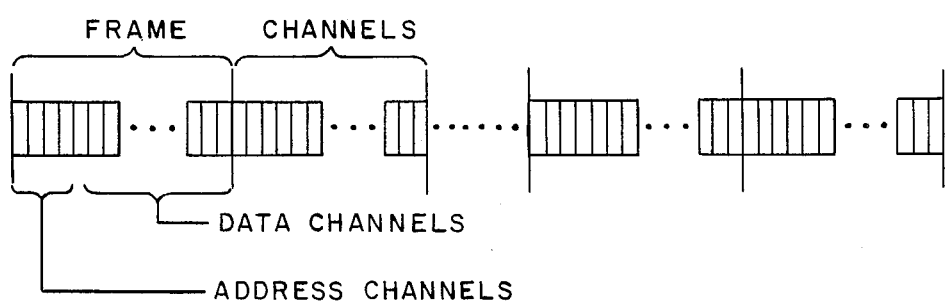
FIG. 2 illustrates an overview of the frame and channel multiplexing of communication signals used on the system of FIG. 1.

FIG. 2 illustrates a graphic representation of the resulting signal format for the communication signal 24 using the TDM frames. In FIG. 2, the TDM communication signal 24 comprises a series or train of successive fixed duration frames within which messages or data are transmitted. Each frame consists of a number of channels which represent substantially identical, sub-frame length periods over which data is transferred. This means that messages or message signals are transferred a few bits at a time during each successive frame until the message is completed. The preferred embodiment divides each frame into 25 sub-frames or channels. However, those skilled in the art will readily understand that the number of channels depends on the transmitting speed of the communication system 10, number of users to be accommodated and frequency hopping schemes as described below.

When using the TDM approach, information is generally sent over the communication signals 24, 28 in discrete packets. The communication system can accommodate packets of differing length between 4 to 256 characters each, depending on the type of messages, small, coded, etc., being transferred. Each packet contains fields of information such as the type of message, typically a 6 bit entry to distinguish between possible alternative system formats, the length of the message, to allow proper tracking, the body of the message, and the checksum bits. There is also an address field of 24 bits associated with each message as discussed further below. Those skilled in the art will readily understand that some "zero packing" will be used from time to time to assure a uniform frame size regardless of overlapping message lengths, varying pocket sizes and transmission rates, or empty channels. However, unused channels generally will have random data transmitted to improve tracking and acquisition of channels by receivers.

To assure that each receiver is tracking and demodulating a specified channel, series of codes or code masks can be used with the data to detect tracking errors. In order to further reduce interference by increasing isolation and, thereby, increase the system 10 message capacity, Frequency Hopping (FH) of the carrier frequency can be used. An FH technique spreads the power density of the signal 24 over a large portion of the transponder 48 MHz bandwidth, reducing downlink power density which minimizes interference to other communication services and provides processing gain which the receivers use in rejecting the interference of other services. The basic techniques of FH from transmissions are known in the communication art and also provide a vehicle for spreading a signal out over a given bandwidth so that transmission errors caused by frequency selective fading or other transmissive aberrations only affect a small portion of the signal. At the same time, frequency hopping according to a preselected pattern alllows some degree of security for some system 10 users.

In the preferred embodiment, the FH scheme comprises dividing the appropriate transponder into 240 frequencies spread over approximately 24 MHz. The hopping rate for the frequencies of interest is on the other of 200 frequencies per second covering each of the 240 discrete hopping frequencies before recycling. This means that the dwell time for each frequency is about 5 milliseconds. If each TDM frame is transmitted at a new frequency then each frame is 5 milliseconds long and the size of each channel is 0.20 milliseconds in length.

The frequency hop pattern can comprise a simple linear progression from high to low or vice versa, or a more complex pattern based on a pseudo-randomly generated frequency selection sequence. However, those skilled in the art will also recognize that a TDM signal without frequency hopping will benefit greatly from the method and apparatus of the present invention.

Returning to the desired transmission rate of 10,000 symbols per second or 1 symbol every 0.10 millisecond it is seen that each frame period allows 2 symbols to be transmitted per channel. This would imply a transmission rate of 48 code symbols every frame. However, to improve reception, the preferred embodiment uses a fifty (50) symbol transmission rate for each frame with the first symbol period employed for settling time to assure that the receiver has locked onto, and the transmitter is accurately, within the selected frequency and not offset due to the changing characteristics of the frequency source.

The second symbol period is used as a phase reference for the third symbol in the stream of fifty symbols, which is the first message symbol. Each successive symbol is used as a phase reference for the next. This relies on a differentially coherent demodulation scheme as opposed to an absolute phase reference since absolute reference approaches are more complicated and very difficult to achieve in this type of mobile communication system.

The code blocks or symbols are divided into alternating groups or sequences. That is, every other code block is selected and placed in one 24 symbol group for transmission. This separates every other code symbol from its adjacent symbol which spreads code symbols that are close together in code to be far apart in time. This interleaves the code blocks to provide a means of minimizing signal errors generated as a burst of errors in a sequence by spreading the message signal over a wide signal bandwidth.

The FH-TDM type communication signal 24 is transmitted by the Hub 14 through the relay satellite 20 to all of the receivers within a given geographical zone or region serviced by the satellite. This zone can be as large as an entire country, or as narrow as a small state as the application demands. However, regardless of the zone covered by the satellite, each receiver in that zone must detect, monitor, and demodulate the signal 28 in order to receive messages. If the messages are simply applied across all of the channels, then each receiver has to continuously track, demodulate and decode the entire signal to assure reception of a relevant message. This is required because every message header or lead-in in every channel would have to be scanned by each receiver to verify which receiver is designated to receive the message. For large numbers of users this requires very high speed, complex, demodulation circuitry to accomplish. Since speed and complexity increase system cost and decrease reliability, this is undesirable.

In the present invention receiver selection is accomplished using a new receiver addressing technique for TDM communication signals which comprises a two part addressing scheme.

In this technique each receiver is assigned a specific system address which is known to all Hub 14 transmitters or system management centers 18 used by the communication system 10. The receiver address is a unique address which establishes an individual identity for each receiver in the system. The address for each receiver is generally set at the factory and can be made unchangeable by the end user (in the field) to prevent security problems or improper monitoring and response to messages. However, the address can be made dynamically adjustable depending upon the system requirements or costs. In the preferred embodiment, the receiver addresses are designated or determined by a 19 bit address term making approximately 524,288 ($2^{19}$) receiver addresses available which allows a very large number of users for the message communication system 10.

The next step is to divide the total number of channels N (here N=25) in the FH-TDM communication signals 24 and 28 between an address portion of A channels and a data or message portion of D=N−A channels. In the preferred embodiment A is 4 and D is 21. However, other numbers of can be used for the total number of channels and the number of address channels depending upon specific system requirements. Generally the ratio of A address channels to D data channels should be equal to the ratio of the number of data bits in the message to the total number of transmitted bits (message plus address).

The A address channels are used to transmit address designations for those receivers whose messages are being transmitted by the Hub 14. The D data channels are used to transmit the message for the designated receivers. The transmission of a message address precedes each message by a predetermined period of time to allow a receiver to adjust its tracking circuitry and synchronize with the appropriate channel before the arrival of the message.

The address channels are typically designated as system channels 1, 2, 3, . . . etc. However, these channels can be separated by data channels where channel tracking either permits or desires this spacing for receiver demodulation. In addition, the number of channels can be dynamically adjusted by the system 10 to accommodate several problem situations. One problem arises when there are a great number of messages, saturating the address channels but the messages are short, thus leaving excess data channel capacity. In this situation, a data channel could be reassigned to be an address channel. The opposite problem is when there are an average number of few messages but they are all maximum length. The system may find it advantageous to use one of the address channels for data to decrease the number of messages being backlogged.

Each message has an address segment of the 24 bits associated with it which is segregated from the message and transferred over the address channels to flag an appropriate receiver. While each receiver is assigned an individual and unique system address, receivers can also respond to specialized "system" address as well. That is, each is also provided access through a "group" address (if applicable), an "all-call" address, and other "conditional" addresses. By providing these alternate addresses to which a receiver, can respond, it is possible to very efficiently transfer single messages to an entire system or a group of receivers without sending the same message to every designated receiver over a long transmission period. This also provides for the transmision of system type information such as time of day, service changes, etc to all receivers on a periodic basis, by interleaving these types of messages into otherwise unused channel capacity.

Since the communication system uses only a few, A, channels out of N possible channels, the address information is transmitted at a rate of A/N times the frame rate. This means that the address for messages is transmitted at a fraction of the communication signal rate allowing each receiver to monitor the communication signal 28 at this lower rate until it detects its address. When a receiver detects its address, accompanied by a channel assignment, the receiver switches to the appropriate channel and begins demodulating and receiving the message. Therefore, it will be apparent to those skilled in the art that receivers are not demodulating nor decoding the entire, or even a majority of the communication signals transmitted by the communication system 10. This allows a less complex and slower speed reception circuit which reduces power and cost while increasing reliability and ease of construction.

Figure 3:
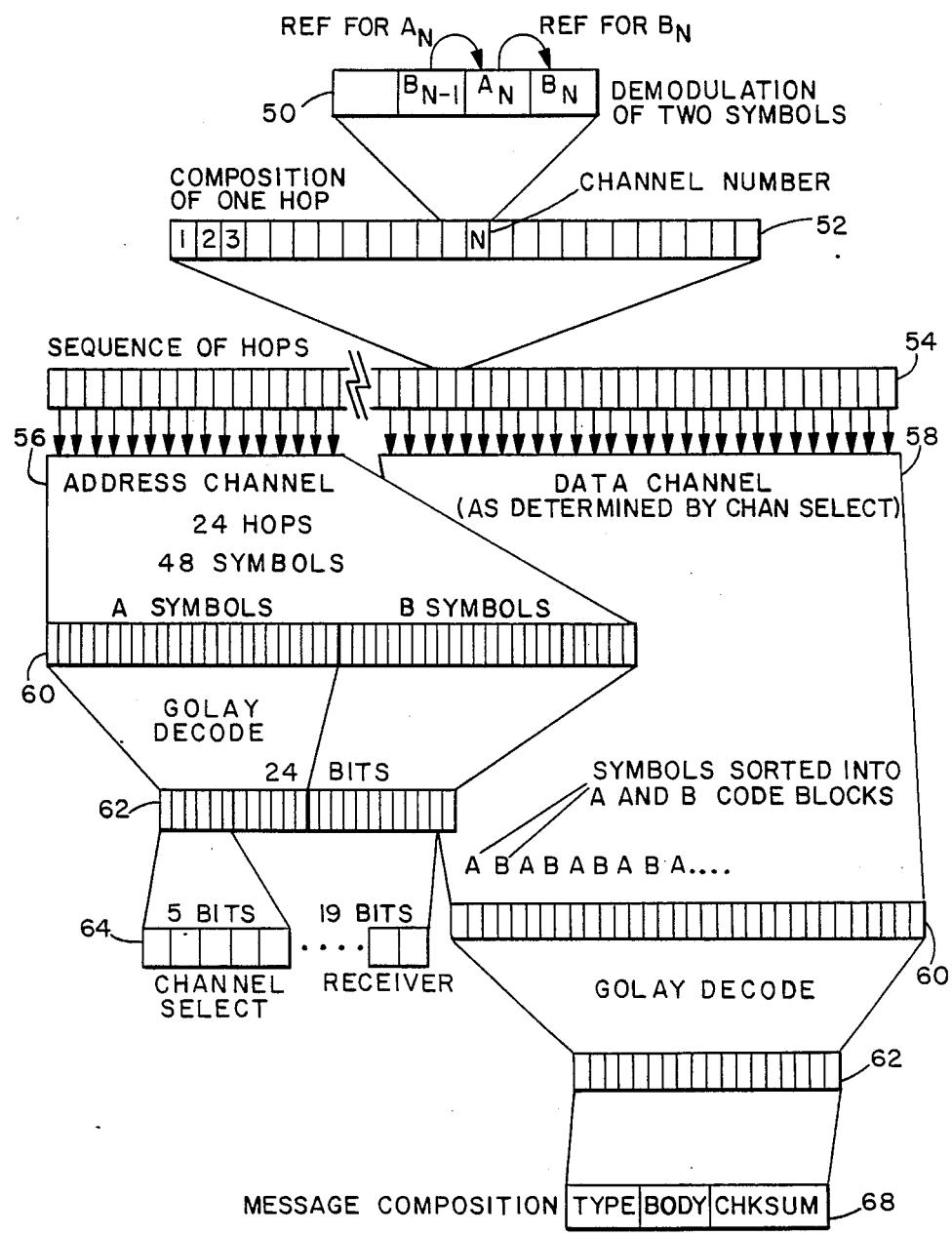
FIG. 3 illustrates an overview of the channel assignment, data transfers, demultiplexing, and decoding steps used in operating the system of FIG. 1.

Reception and decoding of communication signals is illustrated in further detail in FIG. 3. In FIG. 3, an incoming communication signal comprising interleaved code symbols 50 is received by a receiver on a series of signal channels 52 which are frequency hopped in a sequence of hops 54. The digital code symbols comprise the code block symbols described above and are received at a rate of two symbols per channel per frequency hop. There are two extra symbols received during each hop with the first disregarded or lost due to settling of the receiver and the second being used to obtain the phase required to track the next symbol.

Therefore, there are 48 symbols per frame in each hop and 48 symbols received for each channel after 24 hops. After 48 symbols are accumulated they are sorted into a first and second series of symbols shown in FIG. 3 as "A" symbols and "B" symbols. This process removes the interleaving previously impressed on the code symbols as they were transmitted. As can be readily understood by those skilled in the art, those symbols that were close in code are transmitted far apart in time which provides isolation from errors as previously discussed.

For every block of 24 symbols, "A" or "B", a Golay[24,12] decoding step is performed to yield 12 bit blocks of transmitted data. This data will be generated or received at about 5,000 bits per second as originally transmitted. The 12 bit blocks of information now comprise a series of address assignments of messages depending on which channel they were received on.

The messages are received on the data channels 56 while address information is received on the address channels 58. Both message and address code symbols are sorted into 24 bit code blocks 60 using a sorting step and apparatus, and decoded into successive 12 bit blocks 62 using a Golay[24,12] decoder.

The output of the address channels 56 comprise 24 bit length information sequences 64 which use 19 bits to specify the receiver address within the communication system 10 and 5 bits to indicate a channel selection for receiving a message. The output of the message or data channels 58 comprise a series of successive 12 bit blocks 68 which comprise a header that indicates the type of message, including its length, a main body of the message and a series of chksum bits for error detection. The length of the incoming message is important so that the receiver can properly track the entire message or provide an indication of error if the entire message is not received.

As previously discussed, it is clearly understood that address information for a receiver is sent before the message is transmitted on a data channel. The amount of "lead time" for transmitting address information depends on the channel switching speed of the receivers as would be known by those skilled in the art. The address must be provided prior to the message by a time period equal to this switching time plus some settling time for the receiver to properly and accurately track the designated channel.

Figure 4:
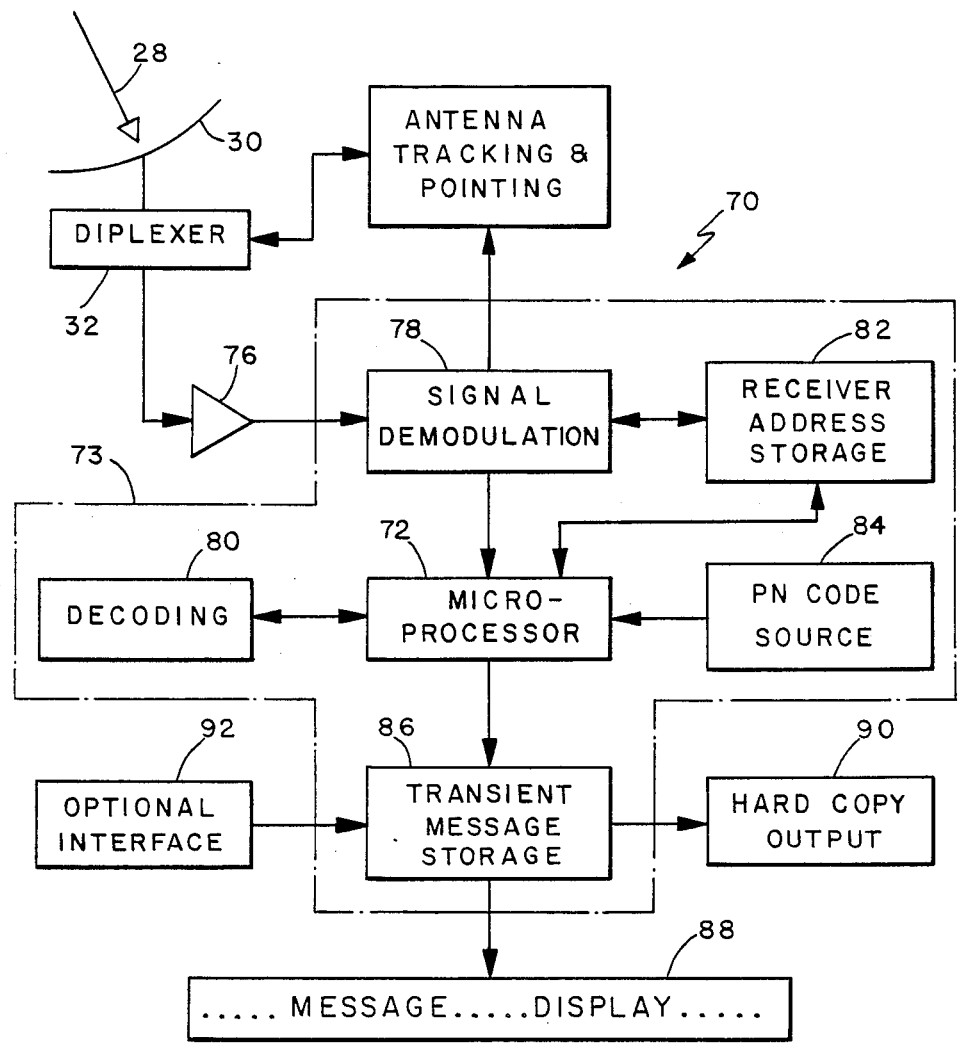
FIG. 4 illustrates a schematic representation of exemplary circuit functions employed in a receiver for the system of FIG. 1.

An exemplary receiver for receiving the communication signals and providing a message output is illustrated in schematic form in FIG. 4. In FIG. 4 a receiver 70 is shown for receiving and demodulating communication signals from the Hub 14. The receiver 70 is connected to the antenna 30 through a diplexer 32 for receiving the satellite downlink signal which is transferred into a demodulator 78 for demodulation into an encoded digital message signal. The demodulator 78 is synchronized with the modulator used in the Hub 14 or the satellite 20.

As previously discussed the receiver 70 does not have to demodulate the entire communication signal 28. Synchronization for the receiver 70 is accomplished by tracking and synchronizing with the frequency hopping pattern of the communication signals. Once a receiver has synchronized with the frequency hopping of the TDM signal frames then the internal frame timing is automatically detected as well.

The mobile receiver or terminal 70 incorporates a microprocessor or similar controller 72 for implementing signal processing, acquisition, and demodulation functions. A low noise amplifier 76 and conventional down-conversion chain provide a signal to the microprocessor for signal acquisition, tracking and demodulation.

The antenna 30 is generally swept through a series of 360° arcs until a signal is detected from the satellite 20, in the receiver's frequency range, above a predetermined threshold. At this juncture one or more tracking and signal processing algorithms are used to determine the direction of highest signal strength and the antenna tracks that direction relative to subsequent receiver or vehicle 12 movement.

Many of the individual functions performed by the microprocessor 72 are illustrated as separate elements in FIG. 4 for purposes of clarity. However, those skilled in the art will readily appreciate that many of the functions surrounded by the dashed line 73 can be performed in a single miniaturized circuit or integrated circuit based microprocesor and related support chips.

A receiver address storage element 82 is connected to the demodulator 78 for storing the address assigned to the receiver 70 and used to determine the presence of a message from the satellite 20 or Hub 14. The address storage element 82 typically comprises a small ROM or similar memory device connected to the microprocessor 72. The address can be hardwired into the microprocessor structure itself such as in the case of scratch memory, or internal RAM although this may not be convenient or cost effective in many applications. In addition, the use of a separate memory element allows alteration by service personnel at a future time where needed.

It is also possible to store the receiver address on a portable storage element such as a magnetic strip or cartridge which can be read by a card reader (not shown) connected to the microprocessor 72. This would allow individual communications system 10 users to move between receivers which are permanently installed in a variety of vehicles and automatically receive messages without informing a central dispatcher of a new receiver location.

Once a receiver address matching that stored in the address storage 82 is detected, the channel designated by the corresponding address information is also received and registered by the receiver 70. The receiver 70 automatically switches to synchronize reception on that channel and begins demodulating a message signal.

If the antenna fails to track the communication signal 28 at any time during the reception of a message, or any type of signal failure or blockage occurs, one or more errors will be detected in signal demodulation and no message will be displayed. Such errors would could include premature termination of the message before the length, time, specified in the message header or the failure of the chksum verification process.

The demodulated communication signal is transferred to a decoder 80 where Golay decoding occurs. At the same time a PN code source or other related code storage element 84 provides any necessary code sequences required to further decode a received message.

The decoded message bits may be temporarily stored in a memory element 86 before visually being displayed by a display element 88. Alternatively, the message can be interfaced to other processing elements through the interface 92 or printed out by the hard copy device 90.

What has been described, then is a new method and apparatus for transmitting messages from central communication status to one or more remote, mobile, receivers which allows low cost mass production of terminal equipment which achieves a high performance level in a variety of interference environments.

The foregoing description of preferred embodiments has been presented for purposes of illustration and description. It is not intended to be exhaustive nor to limit the invention to the precise form disclosed, and many modifications and variations are possible in light of the above teaching. The embodiments were chosen and described to best explain the principles of the invention and its practical application to thereby enable others skilled in the art to best utilize the invention in various embodiments and with various modifications as are suited to the particular use contemplated. It is intended that the scope of the invention be defined by the claims and their equivalents.

What we claim is:

1. A communication system for sending messages from central communication stations to one or more of a plurality of mobile receivers through Earth orbital relay stations using Time Division Multiplexed communication signals, comprising:
   at least one central communication station having transmission means for transmitting a TDM communication signal which comprises a series of N channels, with D data channels, for $D<N$, used exclusively for transmission of message data and A address channels, where $A=N-D$, used for transmission of address information in the form of receiver addresses for receivers designated to receive messages from said station and corresponding ones of said D channels on which said receiver message is transmitted.

2. The communication system of claim 1, wherein said central communication station further comprises:
   receiver assignment means for detecting which of said plurality of receivers each message is directed to;
   channel assignment means for assigning at least one channel to each of said messages at a time from said D channels;
   address control means for transferring a receiver address and an associated channel assignment onto one of said A channels in response to input messages intended for a receiver; and
   message input means connected to said channel assignment means for receiving digital messages and transferring said messages onto said D channels in response to an assignment from said channel assignment means at a rate of one message per channel.

3. The communication system of claim 2, wherein said central communication station further comprises:
   at least one narrow-beam antenna;
   conversion means for converting information to be transmitted to a receiver into a digital message at a predetermined transfer rate.

4. The communication system of claim 3, wherein said transfer rate is at least 5,000 bits per second.

5. The communication system of claim 3 wherein said digital means signals have predetermined transmission periods.

6. The communication system of claim 1 further comprising:
   at least one mobile receiver station, having receiver means for detecting, demodulating and decoding said TDM communication signal, said receiver means being adjusted to receive at least one of said A address channels when not receiving a message; and
   channel selection means connected to said receiver means for adjusting said receiver means to demodulate only a designated one of said D message channels of said TDM communication signal according to a channel assignment received for said mobile receiver on said at least one of said A address channels.

7. The system of claim 6 wherein said a mobile receiver, comprises:
   a narrowbeam antenna;
   receiver means for receiving said communicating signal;
   a demultiplexer, comprising:
      address storage means for recording and storing a preassigned address for said receiver; and
      means for demuliplexing, said TDM communication signal over a time interval equal to at least one time interval for channels in a signal frame depending upon the encounter of said preassigned address for said receiver.

8. The system of claim 7 wherein said mobile receiver further comprises a message display device connected to said demultiplexer for displaying in visual form a series of alphanumeric characters corresponding to a respective message.

9. The communication system of claim 1, wherein said of said messages has a predetermined maximum length M and a ratio of A to D is approximately equal to a ratio of a sum of digital bits used to define a receiver address and channel designation to a sum of bits used to define each of said messages.

10. A method for sending messages from central communication stations to mobile receivers through Earth orbital relay stations, comprising:
    generating a TDM communication signal which is divided into a series of N transmission channels;
    providing digital messages to be transmitted on said channels;
    assigning at least one receiver destination to each message;
    assigning at least one of D data channels to each of said messages where $D<N$;
    transferring each of said messages on at least one of said D channels;
    transferring said channel assignment onto one of A address channels where $A=N-D$;
    detecting, demodulating and decoding said TDM communication signal by at least one mobile receiver;
    adjusting said receiver to detect only of said D data channels of said TDM communication signal in response to said address assignments transmitted on said A address channels; and
    demodulating said one data channel according to said assignment.

11. The method of claim 10 further comprising the steps of applying a Golay[24,12] block coding process to said digital message prior to transmission and applying a Golay[24,12] block decoding process to symbol data received on said one demodulated data channel for each receiver.

12. The method of claim 11 wherein said Golay coding step generates digital symbol data at a rate on the order of 10,000 bits a second.

13. The method of claim 10 further comprising the steps of performing a checksum computation on input digital messages in said transmission means and on corresponding demodulated symbol data in said receiver.

14. The method of claim 10 further comprising the step of hopping a transmission frequency of said TDM communication signal on a predetermined periodic basis over a preselected number of frequencies.

15. A communication system for sending messages from at least one central communication station to one or more of a plurality of mobile receivers through Earth orbital relay stations using Time Division Multiplexed (TDM) communication signals, said system comprising:
  at least one central communication station comprising:
    transmission means for transmitting a TDM communication signal which comprises a series of N channels, with D data channels where $D<N$, said D data channels used for transmission of message data, and with A address channels where $A=N-D$, said A address channels used for transmission of address information in a form of receiver addresses for receivers designated to receive messages from each station and corresponding ones of said D channels on which said receiver message is transmitted;
    receiver assignment means for detecting which of said plurality of receivers each message is directed to;
    channel assignment means for assigning at least one channel to each of said messages at a time from said D channels;
    address control means for transferring a receiver address and an associated channel assignment onto one of said A channels in response to input messages intended for a receiver;
    message input means connected to said channel assignment means for receiving digital messages and transferring said messages onto said D channels in response to an assignment from said channel assignment means at a rate of one message per channel; and
  at least one mobile receiver station comprising:
    receiver means for detecting, demodulating and decoding said TDM communication signal at a rate of about 1/N times a transmission rate of said communication signal, said receiver means being adjusted to receive a selected one of said A address channels when not receiving a message; and
    channel selection means connected to said receiver means for adjusting said receiver means to demodulate only a designated one of said D message channels of said TDM communication signal according to a channel assignment received for said mobile receiver on said selected one of said A address channels.

16. The communication system of claim 15, wherein said central communication station further comprises:
  at least one narrow-beam antenna;
  conversion means for converting information to be transmitted to mobile receiver station into a digital message at a predetermined transfer rate.

17. The communication system of claim 15, wherein said transfer rate is at least 5000 bits per second.

18. The communication system of claim 15 wherein said digital message signals have predetermined transmission periods.

19. The system of claim 15 wherein said mobile receiver comprises:
  a narrowbeam antenna;
  receiver means for receiving said communication signal;
  a demultiplexer, comprising:
    address storage means for recording and storing a preassigned address for said receiver; and
    means for demultiplexing, said TDM communication signal over a time interval equal to at least one time interval for channels in a signal frame depending upon the encounter of said preassigned address for said receiver.

20. The system of claim 19 further comprising a message display device connected to said demultiplexer for displaying in visual form a series of alphanumeric characters for displaying a message.

21. The communication system of claim 15, wherein each of said messages has a predetermined maximum length M and a ratio of A to D is approximately equal to a ratio of a sum of digital bits used to define a receiver address and channel designation to a sum of bits used to define each of said messages.

* * * * *

UNITED STATES PATENT AND TRADEMARK OFFICE
CERTIFICATE OF CORRECTION

PATENT NO. : 4,928,274

DATED : May 22, 1990

INVENTOR(S) : Klein S. Gilhousen, et al

It is certified that error appears in the above-identified patent and that said Letters Patent is hereby corrected as shown below:

On the title page, item [75] should read Klein S. Gilhousen, Franklin P. Antonio and Irwin M. Jacobs.

Signed and Sealed this

Twenty-third Day of October, 1990

*Attest:*

HARRY F. MANBECK, JR.

*Attesting Officer*      *Commissioner of Patents and Trademarks*